US012023290B2

(12) United States Patent
Hung

(10) Patent No.: US 12,023,290 B2
(45) Date of Patent: Jul. 2, 2024

(54) REHABILITATION ASSISTING APPARATUS

(71) Applicant: Shih-Chieh Hung, Hsinchu (TW)

(72) Inventor: Shih-Chieh Hung, Hsinchu (TW)

( * ) Notice: Subject to any disclaimer, the term of this patent is extended or adjusted under 35 U.S.C. 154(b) by 586 days.

(21) Appl. No.: 17/365,184

(22) Filed: Jul. 1, 2021

(65) Prior Publication Data

US 2023/0000710 A1 Jan. 5, 2023

(51) Int. Cl.

| | |
|---|---|
| ***A61H 1/00*** | (2006.01) |
| ***A61G 7/015*** | (2006.01) |
| ***A61H 1/02*** | (2006.01) |
| *A61G 7/008* | (2006.01) |
| *A61G 13/00* | (2006.01) |

(52) U.S. Cl.

CPC ........... *A61H 1/005* (2013.01); *A61H 1/0244* (2013.01); *A61G 7/008* (2013.01); *A61G 7/015* (2013.01); *A61G 13/009* (2013.01); *A61H 2001/0248* (2013.01); *A61H 2201/0107* (2013.01); *A61H 2201/12* (2013.01); *A61H 2201/163* (2013.01); *A61H 2201/1676* (2013.01); *A61H 2203/0456* (2013.01)

(58) Field of Classification Search

CPC ........ A61H 1/005; A61H 1/0244; A61H 1/02; A61H 1/0214; A61H 1/0218–0229; A61H 1/0237; A61H 1/024; A61H 1/0255–266; A61H 2201/0107; A61H 2201/12; A61H 2201/163; A61H 2201/1676; A61H 2201/1642; A61H 2201/0142; A61H 2201/149; A61H 2201/0203; A61H 2201/0207; A61H 2201/0211; A61H 2201/233; A61H 2201/0248; A61H 2201/0251; A61H 2203/0456; A61H 2001/0248; A61G 7/008; A61G 7/005; A61G 7/015; A61G 13/009; Y10S 482/907; A61F 5/3769

See application file for complete search history.

(56) References Cited

U.S. PATENT DOCUMENTS

| | | | | |
|---|---|---|---|---|
| 3,771,518 A * | 11/1973 | Greissing | A61H 1/0222 | 606/243 |
| 4,658,450 A * | 4/1987 | Thompson | A61G 7/008 | 5/607 |
| 7,153,251 B2 * | 12/2006 | Broadbent | A61H 1/0255 | 482/148 |
| 2006/0074366 A1 * | 4/2006 | Ryan | A61H 1/0218 | 602/19 |
| 2017/0348170 A1 * | 12/2017 | Keepers | A61H 1/0244 | |
| 2019/0117488 A1 * | 4/2019 | Ebara | A61H 1/006 | |

* cited by examiner

*Primary Examiner* — Samchuan C Yao
*Assistant Examiner* — Sara K Toich
(74) *Attorney, Agent, or Firm* — Muncy, Geissler, Olds & Lowe, P.C.

(57) ABSTRACT

A rehabilitation assisting apparatus has a main body, a waist assisting unit mounted above the main body, and two leg assisting units separately disposed side by side above the main body. Each of the leg assisting units is pivotally connected with the waist assisting unit. An upper rocking plate of the waist assisting unit can be driven to roll leftward and rightward to rehabilitate or train a waist of a user. A leg lifting bracket of each of the leg assisting unit can be driven to pitch upward and downward to rehabilitate or train a leg of the user.

12 Claims, 9 Drawing Sheets

REHABILITATION ASSISTING APPARATUS

BACKGROUND OF THE INVENTION

1. Field of the Invention

The present invention relates to a rehabilitation assisting apparatus, especially to a rehabilitation assisting apparatus that is capable of assisting training waist or legs of a patient.

2. Description of the Prior Art(s)

If a person holds a pose, especially a bad pose, for a period of time, some parts of his body would feel uncomfortable due to malalignments of the bones or joints, or due to muscle ache caused by muscular strain. The muscle ache may be relieved by stretching the muscles, or by beating, kneading or pressing the muscles with a massager, so as to allow the person to feel comfortable briefly.

However, if there is lesions on the leg bones, the spine bones or their joints that are for supporting weight of the human body, maintaining balance of the human body or protecting the nervous system, it is usually unable to provide good rehabilitative effects by massaging or stretching.

To overcome the shortcomings, the present invention provides a rehabilitation assisting apparatus to mitigate or obviate the aforementioned problems.

SUMMARY OF THE INVENTION

The main objective of the present invention is to provide a rehabilitation assisting apparatus that has a main body, a waist assisting unit, and two leg assisting units.

The main body has a mounting frame.

The waist assisting unit has a base, an upper rocking plate, a linkage module, and a first driving set. The base is mounted on the mounting frame and is provided with a lower pivot bracket. The lower pivot bracket has a lower end mounted to the base and an upper end provided with a pivot seat. The upper rocking plate is mounted above the base and is provided with an upper pivot bracket. The upper pivot bracket has an upper end mounted to the upper rocking plate and a lower end provided with a pivot seat. The linkage module has a first linkage unit and a second linkage unit. A lower end of the first linkage unit and a lower end of the second linkage unit are separately disposed on the base and are pivotally connected with the base. An upper end of the first linkage unit and an upper end of the second linkage unit are separately disposed on the upper rocking plate and are pivotally connected with the upper rocking plate. A distance defined between the lower end of the first linkage unit and the lower end of the second linkage unit is greater than a distance defined between the upper end of the first linkage unit and the upper end of the second linkage unit. The first driving set has a first motor pivotally mounted on the pivot seat of the lower pivot bracket, a screw having an end securely connected to an output end of the first motor, and a screw sleeve pivotally mounted on the pivot seat of the upper pivot bracket and mounted around and engaging with another end of the screw of the first driving set.

The two leg assisting units are separately disposed side by side above the main body. Each of the leg assisting units is pivotally connected with the waist assisting unit and has a connecting seat, a leg lifting bracket, and a second driving set. An end of the connecting seat is securely connected to the upper rocking plate of the waist assisting unit and another end of the connecting seat is provided with a pivot seat. The leg lifting bracket is elongated, has an end pivotally connected to the connecting seat, and is provided with a movable frame, a pivot seat and a leg placing plate. The movable frame is mounted on a bottom of the leg lifting bracket and has two ends. One of the ends of the movable frame is securely connected with the leg lifting bracket. The pivot seat is mounted on the other end of the movable frame. The leg placing plate is mounted on a top of the leg lifting bracket. The second driving set has a second motor pivotally mounted on the pivot seat of the supporting arm seat, a screw having an end securely connected to an output end of the second motor, and a screw sleeve pivotally mounted on the pivot seat of the movable frame and mounted around and engaging with another end of the screw of the second driving set.

When the rehabilitation assisting apparatus is in use, a user lies flat on the main body with his waist disposed on the upper rocking plate and his legs placed on the leg lifting brackets of the two leg assisting units respectively. The user can activate only the waist assisting unit, only the leg assisting units, or activate both the waist assisting unit and the leg assisting units at the same time, so as to form different types of rehabilitation or training.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
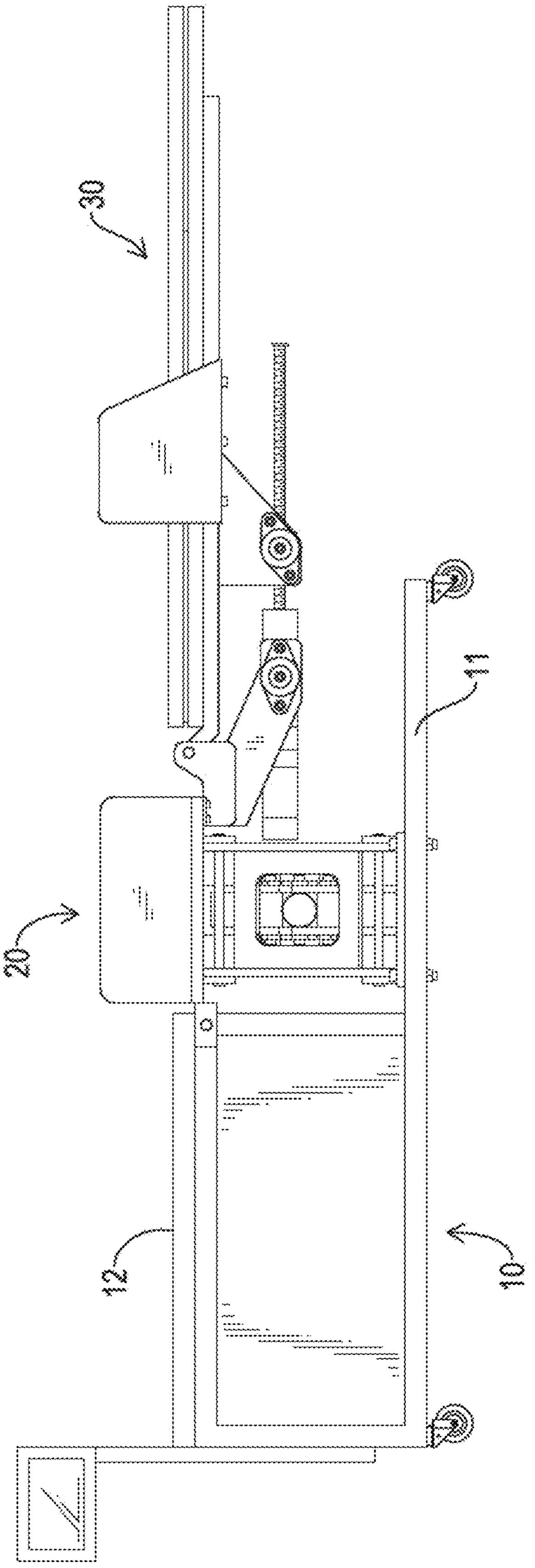
FIG. 1 is a front view of a rehabilitation assisting apparatus in accordance with the present invention.
Figure 2:
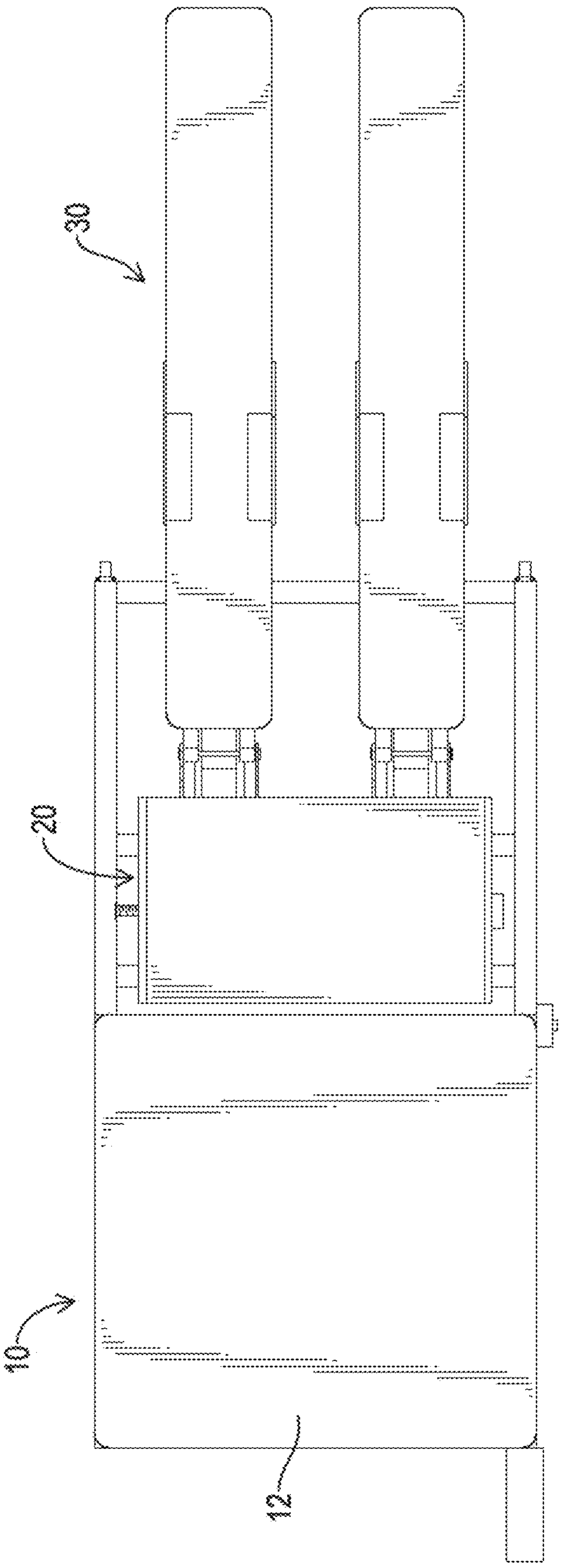
FIG. 2 is a top view of the rehabilitation assisting apparatus in FIG. 1.
Figure 3:
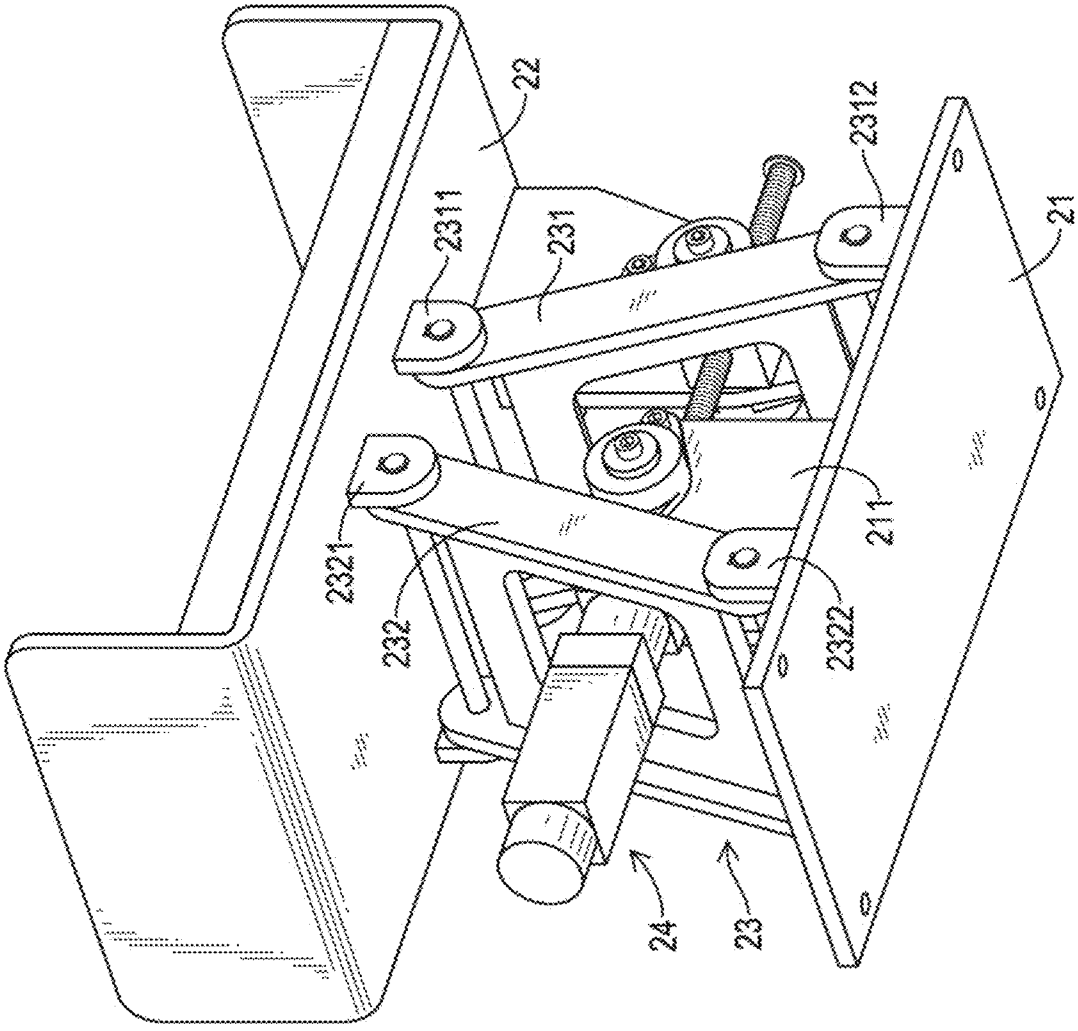
FIG. 3 is a perspective view of a waist assisting unit of the rehabilitation assisting apparatus in FIG. 1.

With reference to FIGS. 1 and 2, a rehabilitation assisting apparatus in accordance with the present invention comprises a main body 10, a waist assisting unit 20, and two leg assisting units 30. The waist assisting unit 20 is mounted above the main body 10. The two leg assisting units 30 are separately disposed side by side above the main body 10. Each of the leg assisting units 30 is pivotally connected with the waist assisting unit 20. The term "transverse direction" in the specification and claims of the present application and the above-mentioned drawings means an extension direction extending along the main body 10, the waist assisting unit 20, and the leg assisting units 30. The term "crosswise direction" means a direction perpendicular to the transverse direction.

The main body 10 has a mounting frame 11 and a first pad 12. The first pad 12 is mounted on a top of an end portion of the mounting frame 11. The first pad 12 on the mounting frame 11 is used to support an upper body of a user for the user to lie flat on the first pad 12 comfortably. Moreover, the first pads 12 with different functions may be chosen be mounted on the mounting frame 11 according to the users' needs. A plurality of wheels may be mounted on a bottom of the mounting frame 11 for the convenience of moving the rehabilitation assisting apparatus of the present invention. Since a structure of the mounting frame 11 is conventional, a more detailed description is omitted.

The waist assisting unit 20 includes a base 21, an upper rocking plate 22, a linkage module 23, and a first driving set 24.

The base 21 is a panel, is mounted on the mounting frame 11 of the main body 10, and is provided with a lower pivot bracket 211. The lower pivot bracket 211 has a lower end and an upper end. The lower end of the lower pivot bracket 211 is mounted to an upper surface of the base 21. The upper end of the lower pivot bracket 211 is provided with a pivot seat 212. The upper rocking plate 22 is mounted above the base 21 and is provided with an upper pivot bracket 221. The upper pivot bracket 221 has an upper end and a lower end. The upper end of the upper pivot bracket 221 is mounted to a lower surface of the upper rocking plate 22. The lower end of the upper pivot bracket 221 is provided with a pivot seat 222.

Figure 4:
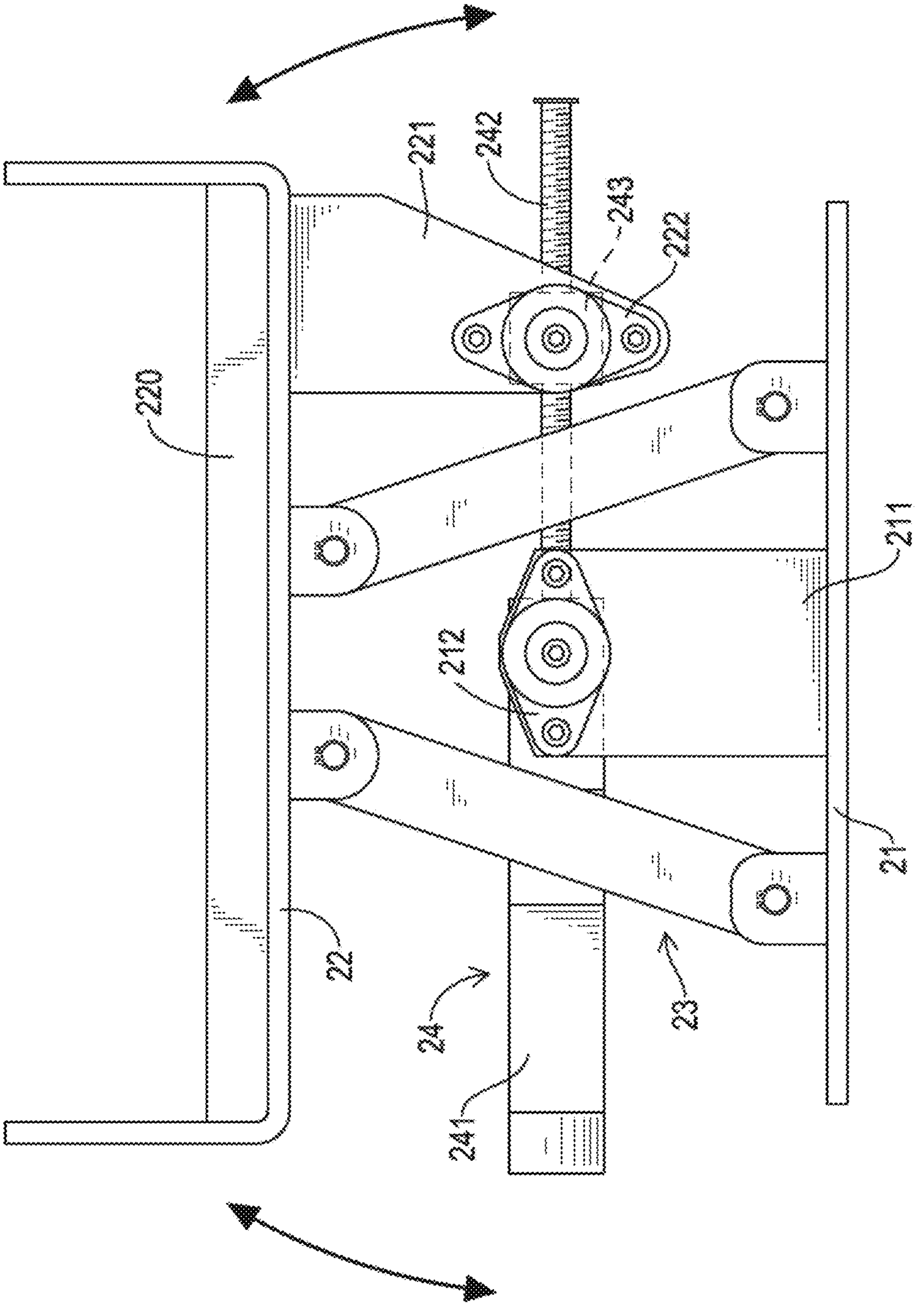
FIG. 4 is a side view of the waist assisting unit in FIG. 3.
Figure 5:
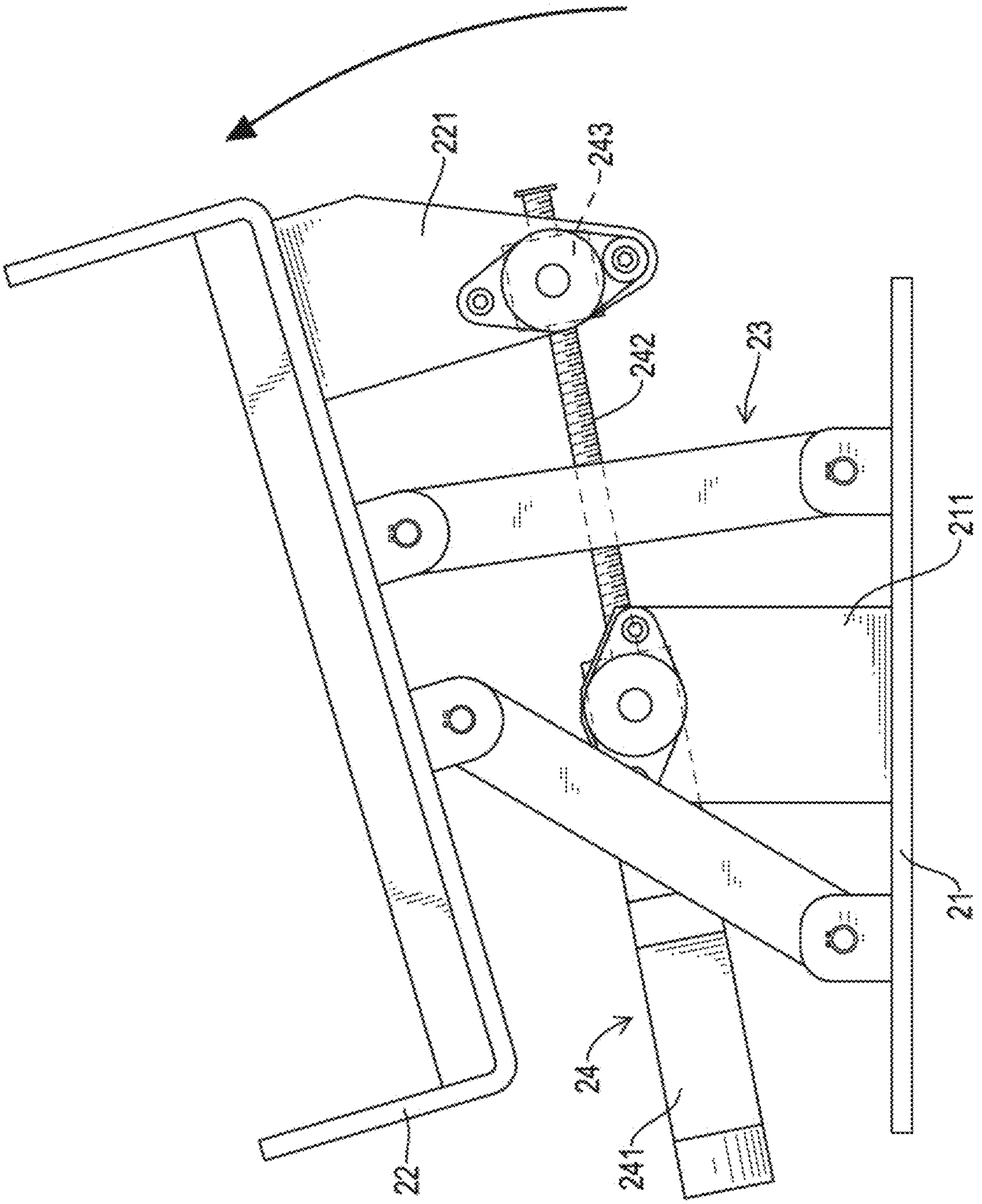
FIG. 5 is an operational side view of the waist assisting unit in FIG. 3.

With further reference to FIGS. 4 and 5, the linkage module 23 includes a first linkage unit 231 and a second linkage unit 232. A lower end of the first linkage unit 231 and a lower end of the second linkage unit 232 are separately disposed on the base 21 and are pivotally connected with the base 21. An upper end of the first linkage unit 231 and an upper end of the second linkage unit 232 are separately disposed on the upper rocking plate 22 and are pivotally connected with the upper rocking plate 22. Accordingly, a linkage mechanism is formed. Moreover, a distance defined between the lower end of the first linkage unit 231 and the lower end of the second linkage unit 232 is greater than a distance defined between the upper end of the first linkage unit 231 and the upper end of the second linkage unit 232. In the preferred embodiment as shown in the drawings, a distance defined between a position where the upper end of the first linkage unit 231 is connected to the upper rocking plate 22 and a position where the lower end of the first linkage unit 231 is connected to the base 21 is equal to a distance defined between a position where an upper end of the second linkage unit 232 is connected to the upper rocking plate 22 and a position where the lower end of the second linkage unit 232 is connected to the base 21.

The first driving set 24 includes a first motor 241, a screw 242, and a screw sleeve 243. The first motor 241 is pivotally mounted on the pivot seat 212 of the lower pivot bracket 211 and has an output end. The first motor 241 can be controlled to rotate the output end forward or backward. Since the above-mentioned way to control the first motor 241 is conventional, a more detailed description is omitted. An end of the screw 242 of the first driving set 24 is securely connected to the output end of the first motor 241. The screw sleeve 243 of the first driving set 24 is pivotally mounted on the pivot seat 222 of the upper pivot bracket 221, and is mounted around and engages with another end of the screw 242 of the first driving set 24. Thus, the first motor 241 can be driven to drive the screw 242 of the first driving set 24 to rotate forward or backward. As the first motor 241 drives the screw 242 of the first driving set 24 to rotate forward or backward, the upper rocking plate 22 rolls leftward and rightward in the crosswise direction. In the preferred embodiment as shown in the drawings, the upper rocking plate 22 rolls relative to the base 21 in a direction that is perpendicular to the transverse direction.

In the preferred embodiment as shown in the drawings, the first linkage unit 231 and the second linkage unit 232 are hollow frames. Two first lower pivot seats 2312 are disposed on the upper surface of the base 21 and correspond in position to two opposites sides of the first linkage unit 231 respectively. A pivot shaft is mounted through the two first lower pivot seats 2312 and a lower end of the first linkage unit 231, such that the first linkage unit 231 is pivotally connected with the base 21. Two second lower pivot seats 2322 are disposed on the upper surface of the base 21 and correspond in position to two opposites sides of the second linkage unit 232 respectively. A pivot shaft is mounted through the two second lower pivot seats 2322 and a lower end of the second linkage unit 232, such that the second linkage unit 232 is pivotally connected with the base 21. Moreover, two first upper pivot seats 2311 are disposed on the lower surface of the upper rocking plate 22 and correspond in position to the two opposites sides of the first linkage unit 231 respectively. A pivot shaft is mounted through the two first upper pivot seats 2311 and an upper end of the first linkage unit 231, such that the first linkage unit 231 is pivotally connected with the upper rocking plate 22. Two second upper pivot seats 2321 are disposed on the lower surface of the upper rocking plate 22 and correspond in position to the two opposites sides of the second linkage unit 232 respectively. A pivot shaft is mounted through the two second upper pivot seats 2321 and an upper end of the second linkage unit 232, such that the second linkage unit 232 is pivotally connected with the upper rocking plate 22.

Specifically, the upper rocking plate 22 is U-shaped in cross-section with a second pad 220 mounted in the upper rocking plate 22. When the user lies flat on the rehabilitation assisting apparatus of the present invention, the user's buttocks is comfortably placed on the second pad 220 and is restricted by two side panels of the U-shaped upper rocking plate 22, such that the user's buttocks do not slide away from the second pad 220. In the preferred embodiment as shown in the drawings, the second pad 22 and the first pad 12 are disposed adjacent to each other and are located at the same height.

Figure 6:
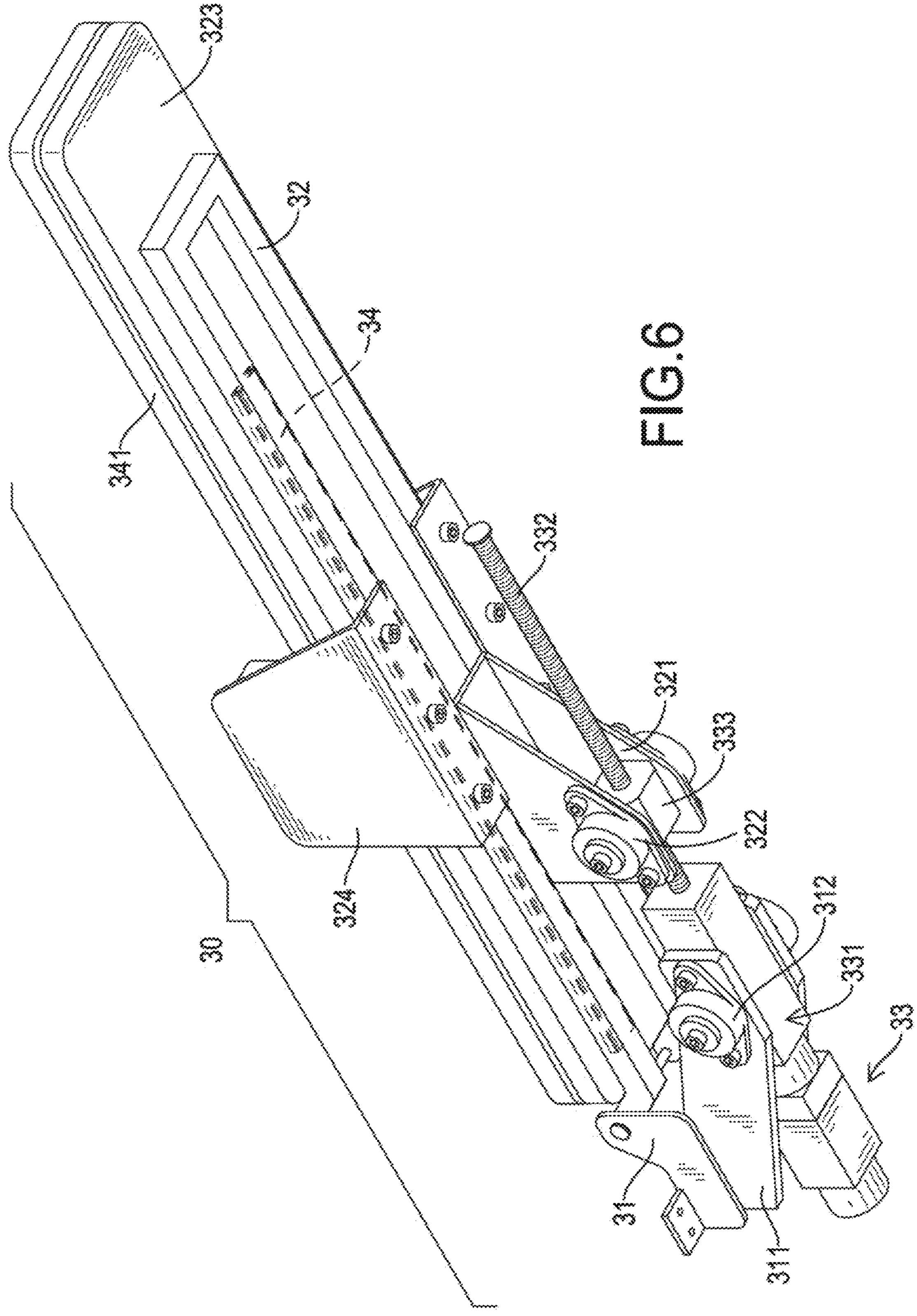
FIG. 6 is a perspective view of a leg assisting unit of the rehabilitation assisting apparatus in FIG. 1.
Figure 7:
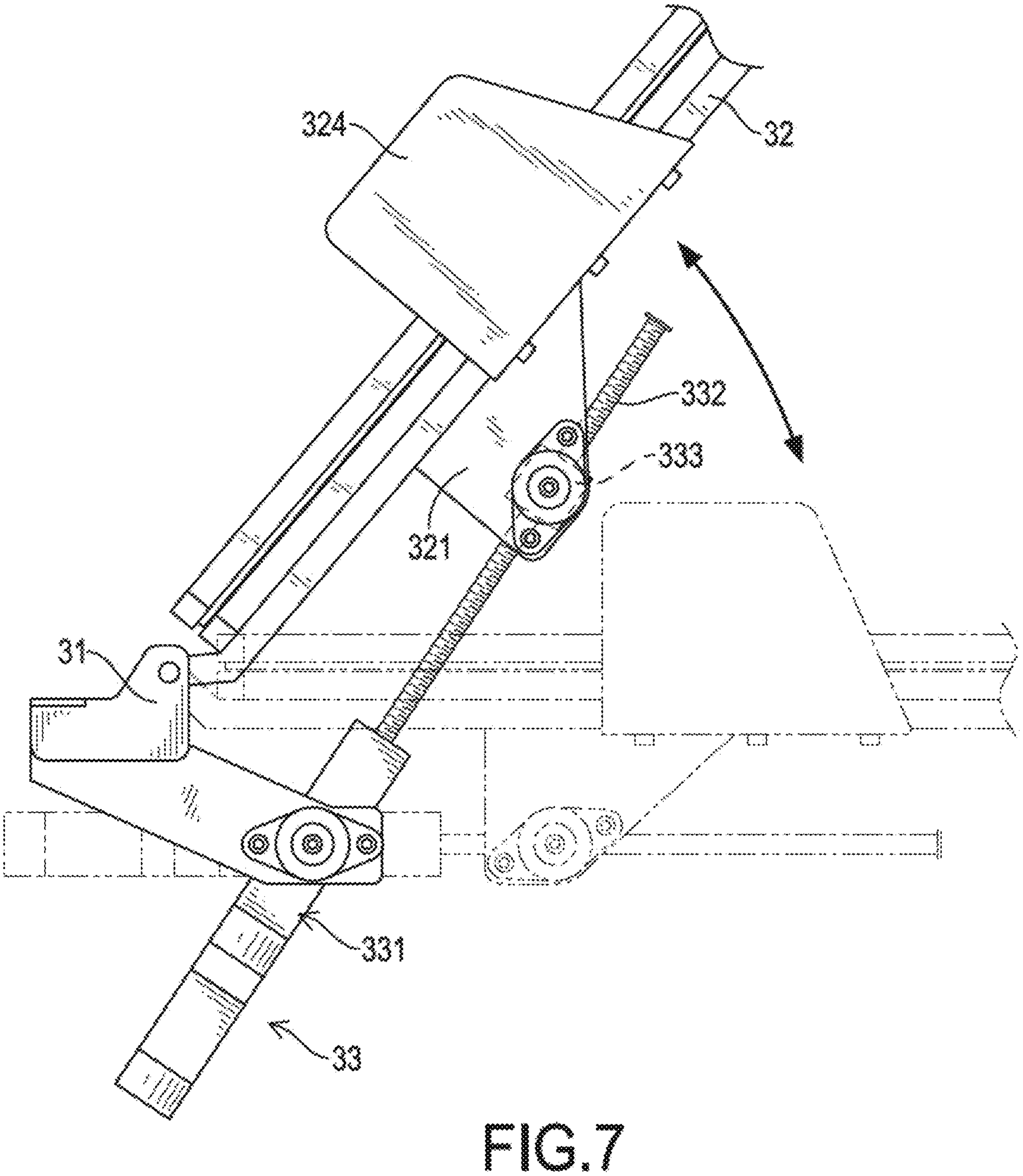
FIG. 7 is an operational side view of the leg assisting unit in FIG. 6.

With further reference to FIGS. 6 and 7, each of the leg assisting units 30 includes a connecting seat 31, a leg lifting bracket 32, and a second driving set 33. An end of the connecting seat 31 is securely connected to the upper rocking plate 22 of the waist assisting unit 20. Thus, when the upper rocking plate 22 rolls, the two leg assisting units 30 are driven to roll by the upper rocking plate 22 accordingly.

The connecting seat 31 is further provided with a supporting arm seat 311 and the supporting arm seat 311 is provided with a pivot seat 312. The connecting seat 31 and the pivot seat 312 on the supporting arm seat 311 are oppositely disposed on the supporting arm seat 311.

The leg lifting bracket 32 is elongated and has an end pivotally connected to the connecting seat 31. A length of the leg lifting bracket 32 matches a length of the user's leg. The leg lifting bracket 32 is provided with a movable frame 321, a pivot seat 322, a leg placing plate 323, and two protecting plates 324. The movable frame 321 is mounted on a bottom of the leg lifting bracket 32 and has two ends. One of the ends of the movable frame 321 is securely connected with the leg lifting bracket 32. The pivot seat 322 is mounted on the other end of the movable frame 321. The leg placing plate 323 is mounted on a top of the leg lifting bracket 32.

The two protecting plates 324 are mounted on two opposite sides of the leg lifting bracket 32 respectively. Each of the protecting plates 324 has a bottom securely connected with the leg lifting bracket 32 and a top end protruding upward. When each of the user's legs is placed on a corresponding one of the leg placing plates 323, each leg is restricted by the two protecting plates 324, so as to ensure the safety of the user.

The second driving set 33 includes a second motor 331, a screw 332, and a screw sleeve 333. The second motor 331 is pivotally mounted on the pivot seat 312 of the supporting arm seat 311 and has an output end. The second motor 331 can be controlled to rotate the output end forward or backward. Since the above-mentioned way to control the second motor 331 is conventional, a more detailed description is omitted. An end of the screw 332 of the second driving set 33 is securely connected to the output end of the second motor 331. The screw sleeve 333 of the second driving set 33 is pivotally mounted on the pivot seat 322 of the movable frame 321, and is mounted around and engages with another end of the screw 332 of the second driving set 33. Thus, the second motor 331 can be driven to drive the screw 332 of the second driving set 33 to rotate forward or backward. As the second motor 331 drives the screw 332 of the second driving set 33 to rotate forward or backward, the screw sleeve 333 of the second driving set 33 moves away from or toward the second motor 311. Meanwhile, the leg placing plate 323 pivots on a connecting position of the leg lifting bracket 32 and the connecting seat 31 and the leg assisting unit 30 pitches upward or downward.

Moreover, each of the leg assisting units 30 further includes a slide rail unit 34. The slide rail unit 34 is mounted on the leg placing plate 323 and is provided with a sliding panel 341. A soft pad may be placed on the sliding panel 341. The sliding panel 341 is slidable relative to the leg placing plate 323 via the slide rail unit 34 along the transverse direction. Since a structure of the slide rail unit 34 is conventional, a more detailed description is omitted.

Figure 8:
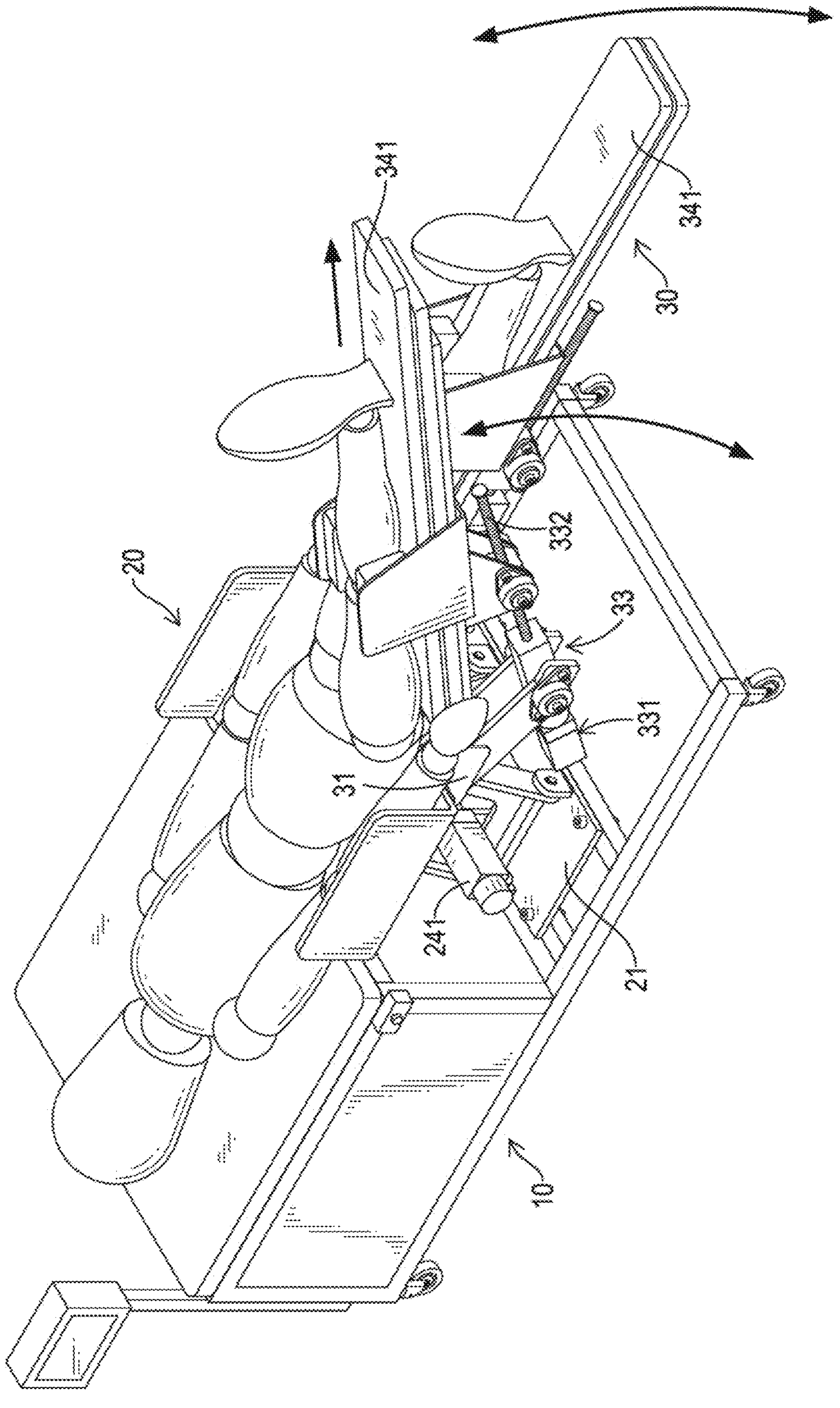
FIG. 8 is an operational perspective view of the rehabilitation assisting apparatus in FIG. 1.

With reference to FIGS. 7 and 8, when the rehabilitation assisting apparatus of the present invention is in use, the user lies flat on the first pad 12 of the main body 10, the second pad 220 of the waist assisting unit 20, and the leg placing plates 323 of the two leg assisting units 30. When rehabilitating or training the legs of the user, the second motor 331 of each of the leg assisting units 30 is controlled to drive the screw 332 of the second driving set 33 to rotate. As the screw 332 of the second driving set 33 rotates forward to allow the screw sleeve 333 of the second driving set 33 to move away from the second motor 331, the screw sleeve 333 of the second driving set 33 drives the leg lifting bracket 32 to pivot on the connecting seat 31 and to pitch upward relative to the waist assisting unit 20. On the other hand, as the screw 332 of the second driving set 33 rotates backward to allow the screw sleeve 333 of the second driving set 33 to move toward the second motor 331, the screw sleeve 333 of the second driving set 33 drives the leg lifting bracket 32 to pitch downward.

Figure 9:
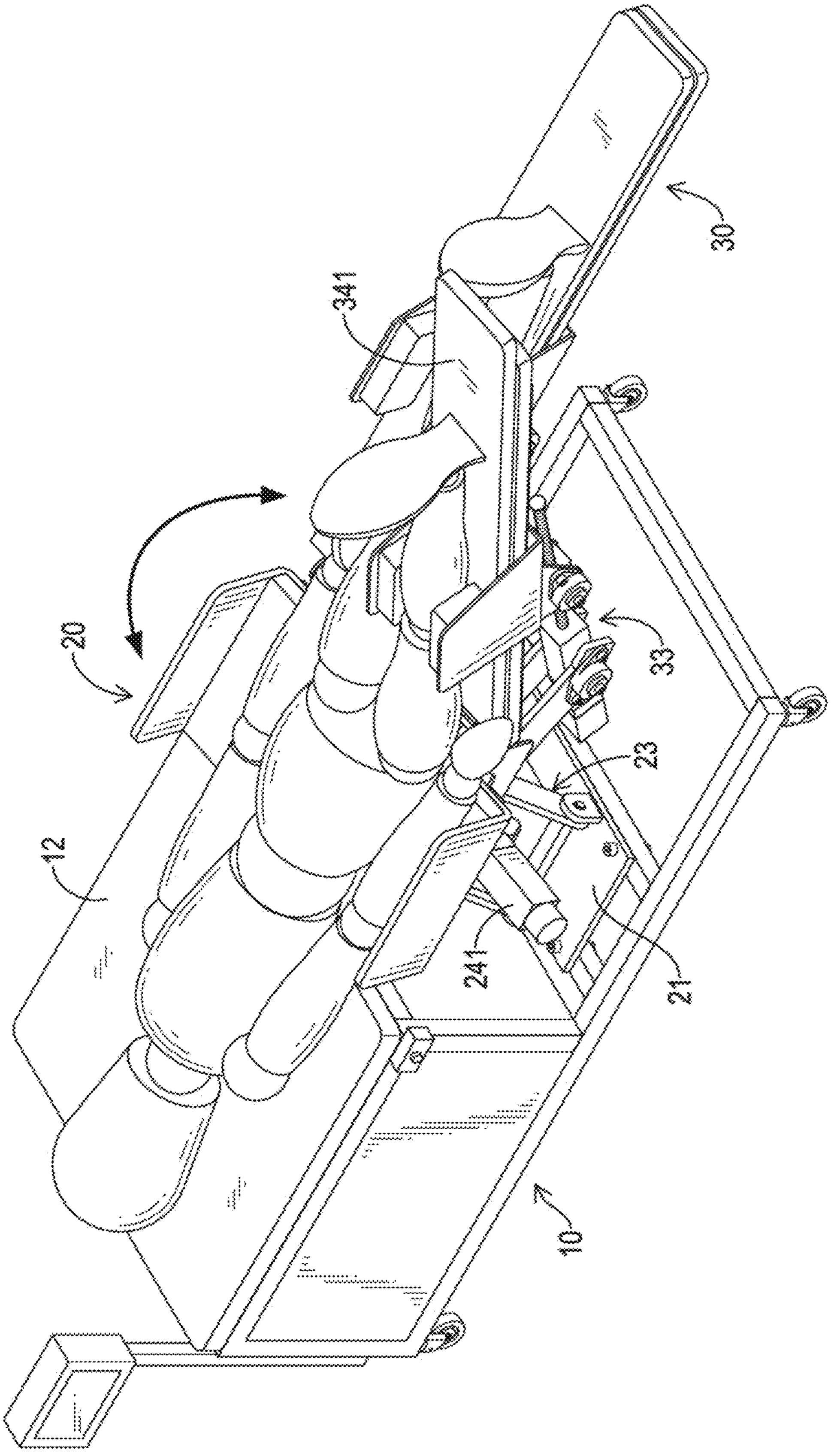
FIG. 9 is another operational perspective view of the rehabilitation assisting apparatus in FIG. 1.

With further reference to FIGS. 4, 5, and 9, when rehabilitating or training the waist of the user with the rehabilitation assisting apparatus of the present invention, the first motor 241 of the waist assisting unit 20 is controlled to drive the screw 242 of the first driving set 24 to rotate forward or backward. Accordingly, the screw sleeve 243 of the first driving set 24 is driven by the screw 242 of the first driving set 24 to move away from or toward the first motor 241. The screw sleeve 243 of the first driving set 24 drives the upper rocking plate 22 to roll back and forth via the linkage module 23. That is, the upper rocking plate 22 rolls relative to the mounting frame 11. Since the user lies above the mounting frame 11 with the user's buttocks placing on the upper rocking plate 22, the waist of the user can be rehabilitated or trained by rolling the upper rocking plate 22 back and forth.

When the rehabilitation assisting apparatus of the present invention is in use, the user can activate only the waist assisting unit 20, only the leg assisting units 30, or activate both the waist assisting unit 20 and the leg assisting units 30 at the same time, so as to form different types of rehabilitation or training. Since control circuits in controlling the waist assisting unit 20 and the leg assisting units 30 are conventional techniques, more detailed descriptions are omitted.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A rehabilitation assisting apparatus comprising: a main body having a mounting frame; a waist assisting unit including: a base mounted on the mounting frame and provided with a lower pivot bracket, and the lower pivot bracket having: a lower end mounted to the base; and an upper end provided with a lower pivot bracket pivot seat; an upper rocking plate mounted above the base and provided with an upper pivot bracket, and the upper pivot bracket having: an upper end mounted to the upper rocking plate; and a lower end provided with an upper pivot bracket pivot seat; a linkage module including a first linkage unit and a second linkage unit, a lower end of the first linkage unit and a lower end of the second linkage unit separately disposed on the base and pivotally connected with the base, and an upper end of the first linkage unit and an upper end of the second linkage unit separately disposed on the upper rocking plate and pivotally connected with the upper rocking plate, wherein a distance defined between the lower end of the first linkage unit and the lower end of the second linkage unit is greater than a distance defined between the upper end of the first linkage unit and the upper end of the second linkage unit; and a first driving set including: a first motor pivotally mounted on the lower pivot bracket pivot seat; a screw having an end securely connected to an output end of the first motor; and a screw sleeve pivotally mounted on the upper pivot bracket pivot seat and mounted around and engaging with another end of the screw of the first driving set; and two leg assisting units separately disposed side by side above the main body, and each of the leg assisting units pivotally connected with the waist assisting unit and including: a connecting seat, and an end of the connecting seat securely connected to the upper rocking plate of the waist assisting unit and another end of the connecting seat provided with a connecting seat pivot seat; a leg lifting bracket being elongated, having an end pivotally connected to the connecting seat, and provided with a movable frame, a movable frame pivot seat and a leg placing plate, wherein the movable frame is mounted on a bottom of the leg lifting bracket and has two ends, and one of the ends of the movable frame is securely connected with the leg lifting bracket, the movable frame pivot seat is mounted on the other end of the movable frame, and the leg placing plate is mounted on a top of the leg lifting bracket; and a second driving set including a second motor pivotally mounted on the connecting seat pivot seat; a screw having an end securely connected to an output end of the second motor; and a screw sleeve pivotally mounted on the movable frame pivot seat and mounted around and engaging with another end of the screw of the second driving set.

2. The rehabilitation assisting apparatus as claimed in claim 1, wherein a distance defined between a position where the upper end of the first linkage unit is connected to the upper rocking plate and a position where the lower end of the first linkage unit is connected to the base is equal to a distance defined between a position where an upper end of the second linkage unit is connected to the upper rocking plate and a position where the lower end of the second linkage unit is connected to the base.

3. The rehabilitation assisting apparatus as claimed in claim 2, wherein the first linkage unit and the second linkage unit are hollow frames.

4. The rehabilitation assisting apparatus as claimed in claim 1, wherein each of the leg assisting units further includes a slide rail unit, the slide rail unit is mounted on the leg placing plate and is provided with a sliding panel, and the sliding panel is slidable relative to the leg placing plate.

5. The rehabilitation assisting apparatus as claimed in claim 2, wherein each of the leg assisting units further includes a slide rail unit, the slide rail unit is mounted on the leg placing plate and is provided with a sliding panel, and the sliding panel is slidable relative to the leg placing plate.

6. The rehabilitation assisting apparatus as claimed in claim 3, wherein each of the leg assisting units further includes a slide rail unit, the slide rail unit is mounted on the leg placing plate and is provided with a sliding panel, and the sliding panel is slidable relative to the leg placing plate.

7. The rehabilitation assisting apparatus as claimed in claim 4, wherein a soft pad is placed on the sliding panel.

8. The rehabilitation assisting apparatus as claimed in claim 5, wherein a soft pad is placed on the sliding panel.

9. The rehabilitation assisting apparatus as claimed in claim 6, wherein a soft pad is placed on the sliding panel.

10. The rehabilitation assisting apparatus as claimed in claim 4, wherein the leg lifting bracket of each leg assisting unit is further provided with two protecting plates, the two protecting plates are mounted on two opposite sides of the leg lifting bracket respectively, and each of the protecting plates has a bottom securely connected with the leg lifting bracket and a top end protruding upward.

11. The rehabilitation assisting apparatus as claimed in claim 5, wherein the leg lifting bracket of each leg assisting unit is further provided with two protecting plates, the two protecting plates are mounted on two opposite sides of the leg lifting bracket respectively, and each of the protecting plates has a bottom securely connected with the leg lifting bracket and a top end protruding upward.

12. The rehabilitation assisting apparatus as claimed in claim 6, wherein the leg lifting bracket of each leg assisting unit is further provided with two protecting plates, the two protecting plates are mounted on two opposite sides of the leg lifting bracket respectively, and each of the protecting plates has a bottom securely connected with the leg lifting bracket and a top end protruding upward.

* * * * *